United States Patent
Bhaskar

(10) Patent No.: US 9,536,013 B2
(45) Date of Patent: Jan. 3, 2017

(54) METHOD AND APPARATUS FOR WEB BROWSING OF HANDHELD DEVICE

(75) Inventor: Naveen Kumar Bhaskar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1175 days.

(21) Appl. No.: 13/359,173

(22) Filed: Jan. 26, 2012

(65) Prior Publication Data

US 2012/0198326 A1    Aug. 2, 2012

(30) Foreign Application Priority Data

Jan. 27, 2011   (IN) .............................. 253/CHE/2011
Jan. 12, 2012   (KR) ........................ 10-2012-0003669

(51) Int. Cl.
G06F 17/00    (2006.01)
G06F 17/30    (2006.01)

(52) U.S. Cl.
CPC ... G06F 17/30905 (2013.01); G06F 17/30899 (2013.01)

(58) Field of Classification Search
CPC ................................................ G06F 17/30899
USPC ......................................................... 715/234
See application file for complete search history.

(56) References Cited

U.S. PATENT DOCUMENTS

| 7,509,433 | B1* | 3/2009 | Hall ........................ H04L 67/06 709/232 |
| 2003/0066032 | A1* | 4/2003 | Ramachandran ... G06F 3/04847 715/234 |
| 2003/0229677 | A1 | 12/2003 | Allan |
| 2006/0101341 | A1* | 5/2006 | Kelly et al. .................... 715/738 |
| 2008/0275951 | A1* | 11/2008 | Hind ........................ H04L 67/22 709/204 |
| 2009/0210882 | A1* | 8/2009 | Srivastava .............. G06F 9/485 718/107 |
| 2011/0060998 | A1* | 3/2011 | Schwartz .......... G06F 17/30873 715/738 |
| 2011/0302524 | A1* | 12/2011 | Forstall ......................... 715/781 |
| 2012/0011430 | A1* | 1/2012 | Parker ................... G06F 3/0485 715/234 |

FOREIGN PATENT DOCUMENTS

KR    100677377    1/2007

* cited by examiner

Primary Examiner — Laurie Ries
(74) Attorney, Agent, or Firm — The Farrell Law Firm, P.C.

(57) ABSTRACT

A method for web browsing of a handheld device includes determining, when a marker is set on at least one object embedded in a webpage, a download status of the at least one object on which the marker is set, and notifying, when a download of the at least one objects is completed, a user of the completion of the download of the at least one object.

16 Claims, 6 Drawing Sheets

METHOD AND APPARATUS FOR WEB BROWSING OF HANDHELD DEVICE

PRIORITY

This application claims priority under 35 U.S.C. §119(a) to an Indian Patent Application filed in the Indian Patent Office on Jan. 27, 2011 and assigned Serial No. IN 253/CHE/2011 and a Korean Patent Application filed in the Korean Intellectual Property Office on Jan. 12, 2012 and assigned Serial No. 10-2012-0003669, the contents of each of which are incorporated herein by reference.

BACKGROUND OF THE INVENTION

1. Field of the Invention

The present invention relates generally to mobile applications, and more particularly, to a web browser for a handheld device.

2. Description of the Related Art

Web browsers for a handheld device such as a mobile phone, a Personal Data Assistant (PDA) and tablets, are becoming comparable to desktop browsers in terms of performance, due to the increase in processor speeds and storage spaces in handheld devices. Conventionally, a user would fetch a webpage with large embedded object(s), such as video or an image. When a webpage rich in objects such as images and videos is fetched from a web server, a considerable amount of time may be needed to download and display the objects on the handheld device. For example, it may take several minutes/hours to buffer a lengthy video embedded in the webpage, which is an inconvenience.

While waiting, the user may explore the remaining section of the webpage or other webpage(s) of his/her interest. However, the user has to repeatedly check the download status of the objects of interest by scrolling/returning to the location of the objects, which also is inconvenient. When the user fetches a webpage to view/read a section of the webpage, in the process of browsing other content on the web, the user may forget to revisit the section of interest and may exit the web browser without viewing/reading the section.

SUMMARY OF THE INVENTION

Accordingly, the present invention provides a method and apparatus for controlling web browsing of a handheld device to conveniently download and display an object embedded in a webpage in a portable terminal.

The present invention also provides a method and apparatus for web browsing of a handheld device to indicate that the download of an object embedded in a webpage is in progress before exiting a web browser.

In an aspect, there is provided a method for web browsing of a handheld device, including determining, when a marker is set on at least one object embedded in a webpage, a download status of the at least one object on which the marker is set, and notifying, when a download of the at least one objects is completed, a user of the completion of the download of the at least one object.

In another aspect, there is provided an apparatus for web browsing of a handheld device including an object marker module for determining, when a marker is set on at least one objects embedded in a webpage, a download status of the at least one objects on which the marker is set, and notifying, when a download of the at least one objects is completed, a user of the completion of the download of the at least one objects.

BRIEF DESCRIPTION OF THE DRAWINGS

The above and other features and advantages of an embodiment of the present invention will be more apparent from the following detailed description taken in conjunction with the accompanying drawings, in which.

The drawings described herein are for illustration purposes only and are not intended to limit the scope of the present disclosure in any way.

DETAILED DESCRIPTION OF THE EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

Figure 1:
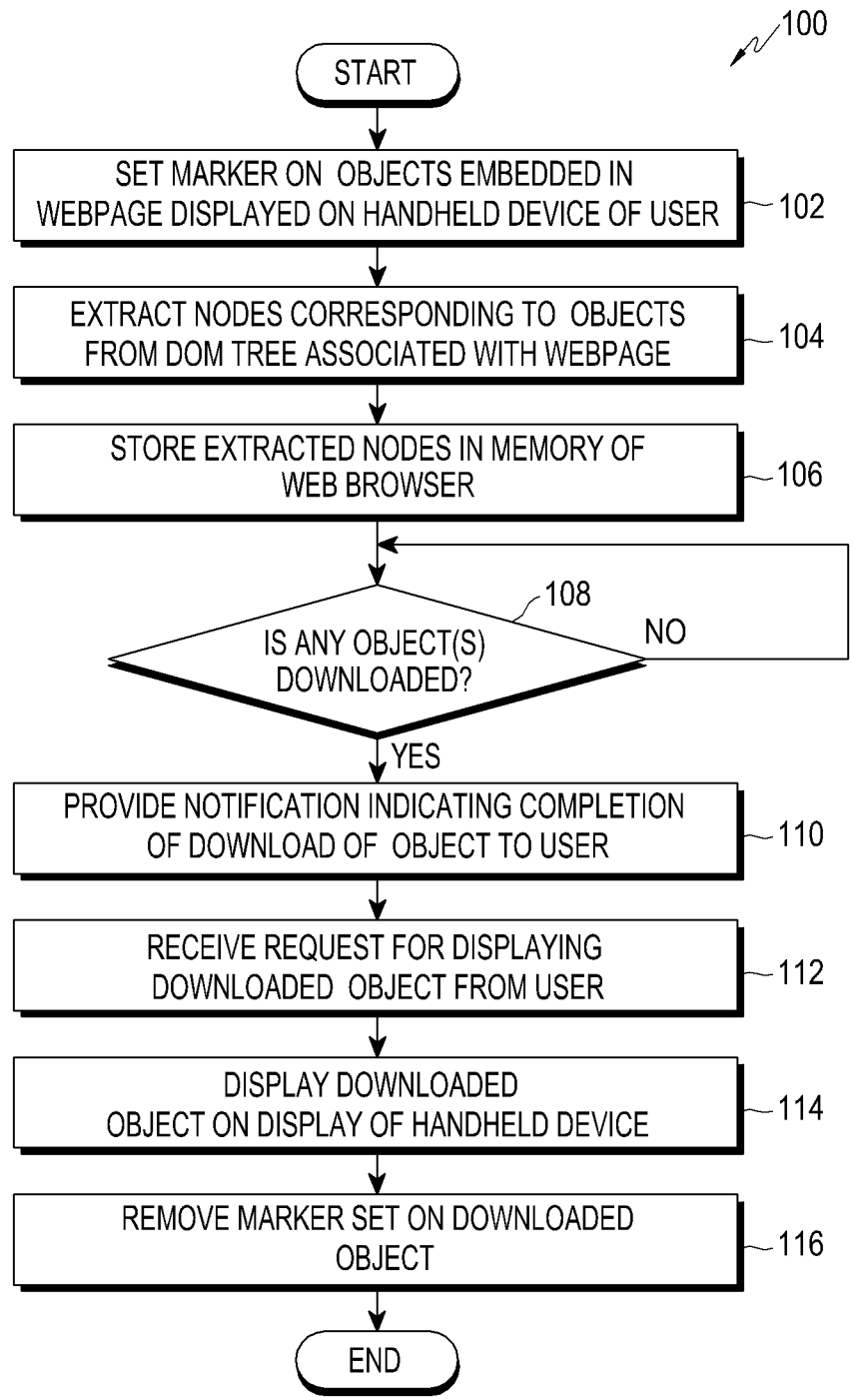
FIG. 1 illustrates a process of notifying a user upon downloading an object embedded in a webpage, according to an embodiment of the present invention.

FIG. 1 is a flowchart 100 of a process of notifying a user upon downloading an object embedded in a webpage, according to an embodiment of the present invention. When a user is browsing on a handheld device using a web browser, opens a webpage including objects such as videos, images and text in the web browser, and wishes to view the objects, a considerable amount of time may be needed to download/buffer and hence through the below process, a notification can be provided to the user after the desired objects are completely downloaded.

At step 102, a marker is set on objects embedded in a webpage associated with the web browser. At step 104, nodes corresponding to the objects are extracted from a Document Object Model (DOM) tree associated with the webpage. At step 106, the nodes corresponding to the objects are stored in memory associated with the web browser. At step 108, it is determined periodically whether any of the objects are completely downloaded from the web server based on the stored nodes. If it is determined that the download of any online object among the objects is completed, as a result of the periodic determination, then at step 110, a notification is provided to the user on a display of the handheld device; otherwise, step 108 is repeated.

For example, a browser engine associated with the web browser creates call back functions when a marker is set on an object. The browser engine links the marker with corresponding node in the DOM tree through the call functions. A visual status indicator associated with the marker set is provided in a scroll bar of a web browser as result of creation of the call back functions. The visual status indicator indicates a download status of the associated object. The visual status indicator may be in a particular color when the download of the associated object is in progress. When the download is complete, a first call back function is triggered and the visual status indicator turns another color which is different from the particular color expressed when the download is in progress. For example, when the download of a related object is in progress, the visual status indicator may be in red, and when the download of the related object is completed, the visual status indicator may turn green.

Accordingly, the visual status indicator facilitates a simple return to a particular section of the webpage.

Upon receiving the notification, the user may visit the webpage with the downloaded object at which the marker was set, as will now be described.

At step 112, a request is received for displaying the downloaded object embedded in the webpage on the display of the handheld device from the user through the notification. At step 114, the downloaded object is displayed on the display of the handheld device based on the corresponding one of the stored nodes.

In one embodiment, the user may tap/click on the green colored visual status indicator indicating the completion of the download on a scroll bar of the web browser to display the associated downloaded object. This triggers a second call back function and the corresponding object is identified based on the stored node as the visual status indicator and the node corresponding to the object are linked through the call back function. The identified object is then displayed at the center of the display screen. At step 116, the marker set on the displayed object embedded in the webpage is removed. In other words, the call functions corresponding to the marker are removed by the browser engine.

Figure 2:
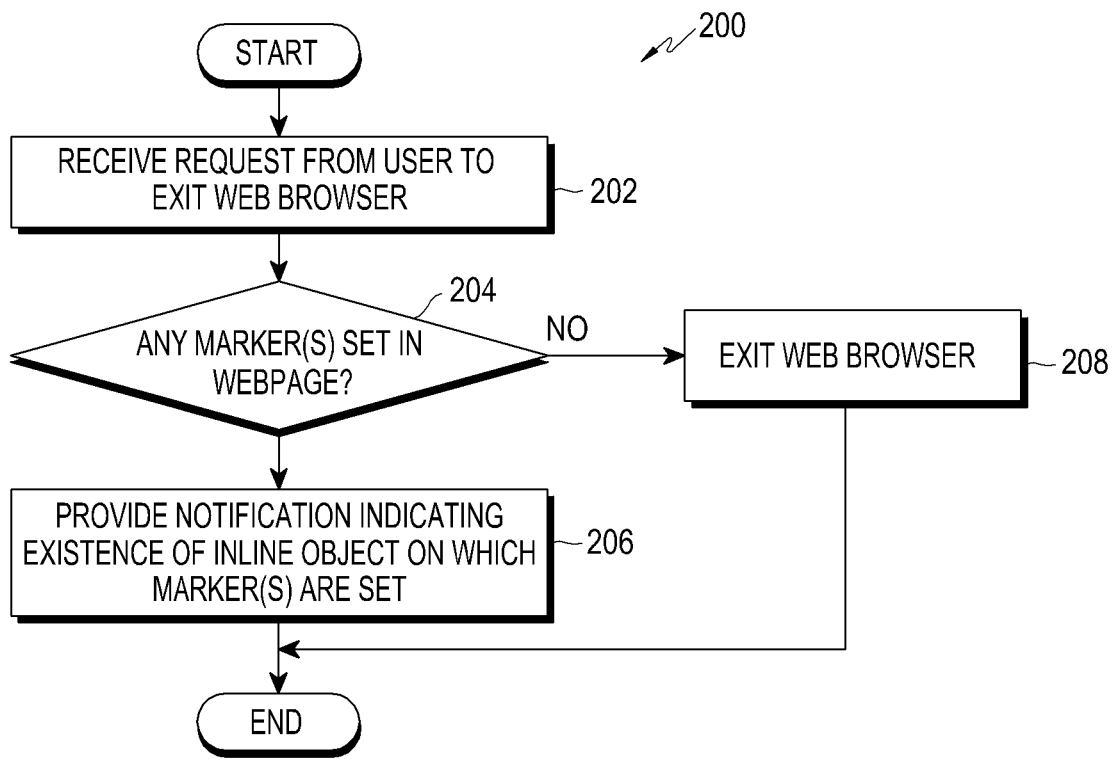
FIG. 2 illustrates a process of providing a notification to the user prior to exiting a web browser displaying the webpage, according to an embodiment of the present invention.

FIG. 2 is a flowchart 200 of a process of providing a notification to a user prior to exiting a web browser displaying the webpage, according an embodiment of the present invention. When a request to exit the web browser associated with the webpage including the at least one object is received from the user at step 202, it is determined at step 204 whether there exists an object on which a marker exists among at least one object embedded in the webpage. If there exists the object on which the marker is set, a notification indicating that the marker is set on the object(s) is provided to the user prior to exiting the web browser, at step 206. If no marker is set, the web browser is exited at step 208.

FIGS. 3A through 3D describe a process of notifying a user upon downloading an object embedded in a webpage 302, according to an embodiment of the present invention.

Figure 3A:
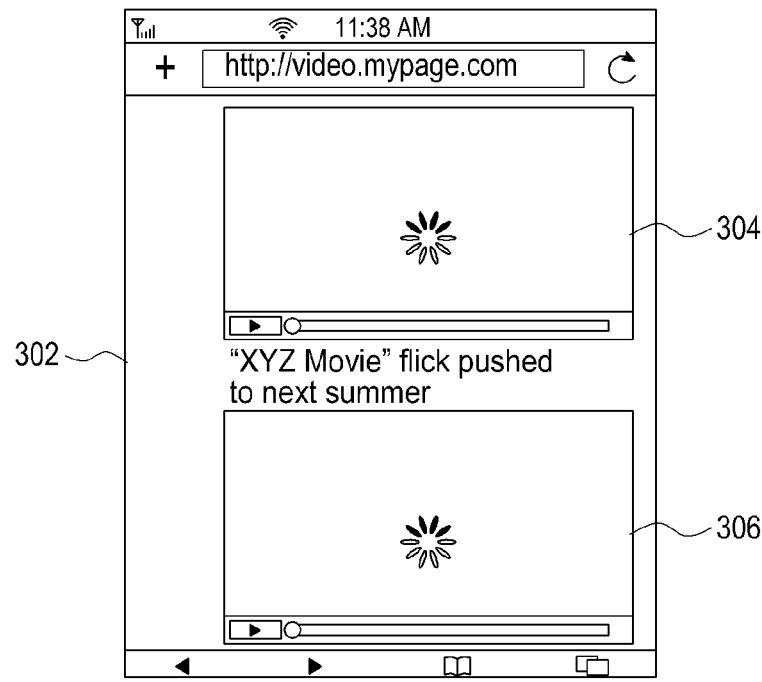
FIGS. 3A through 3D describe a process of notifying the user upon downloading an object embedded in a webpage, according to an embodiment of the present invention.
Figure 3B:
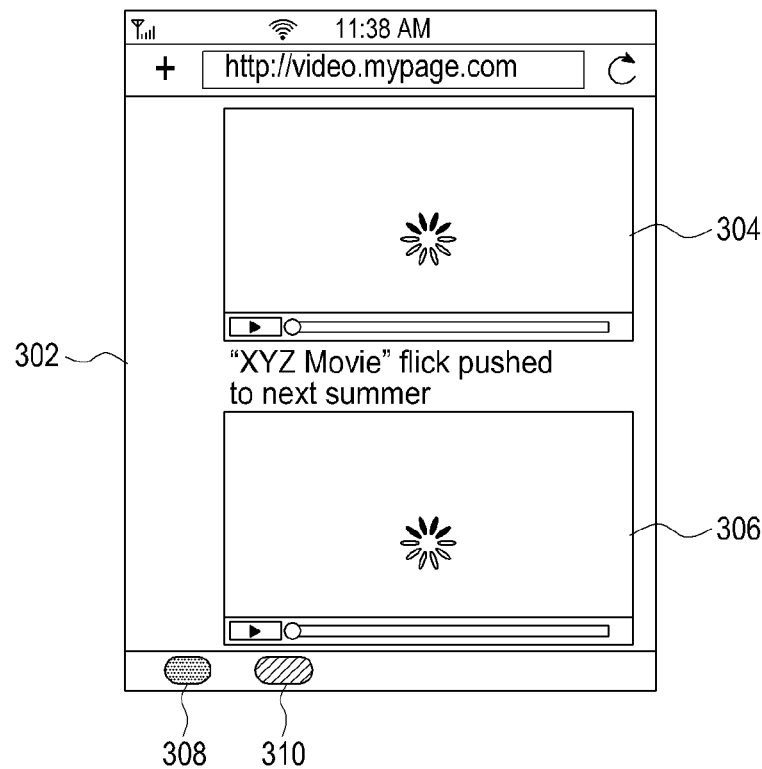

In FIG. 3A, the user receives the webpage 302 embedding multiple objects (e.g., videos) from a web server using a web browser of a handheld device. When the user wishes to watch videos 304 and 306 embedded in the webpage 302, because the videos 304 and 306 are downloading, the user sets a marker on each of the videos 304 and 306 by tapping on the videos 304 and 306 or by selecting a 'set marker' option from a right click menu, depending on the type of the handheld device. Upon setting the markers, the web browser creates respective visual stator indicators 308 and 310 in a status bar of the web browser as shown in FIG. 3B. For example, the visual indicators 308 and 310 may be placed in a horizontal or vertical scroll bar of the web browser. The color of the visual status indicators 308 and 310 in the web browser is red, indicating that the videos 304 and 306 are in the process of downloading.

Figure 3C:
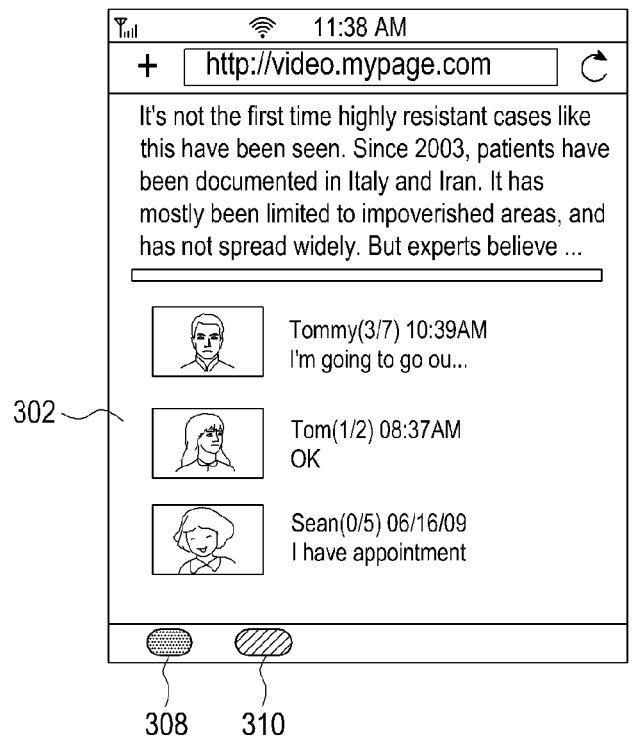
Figure 3D:
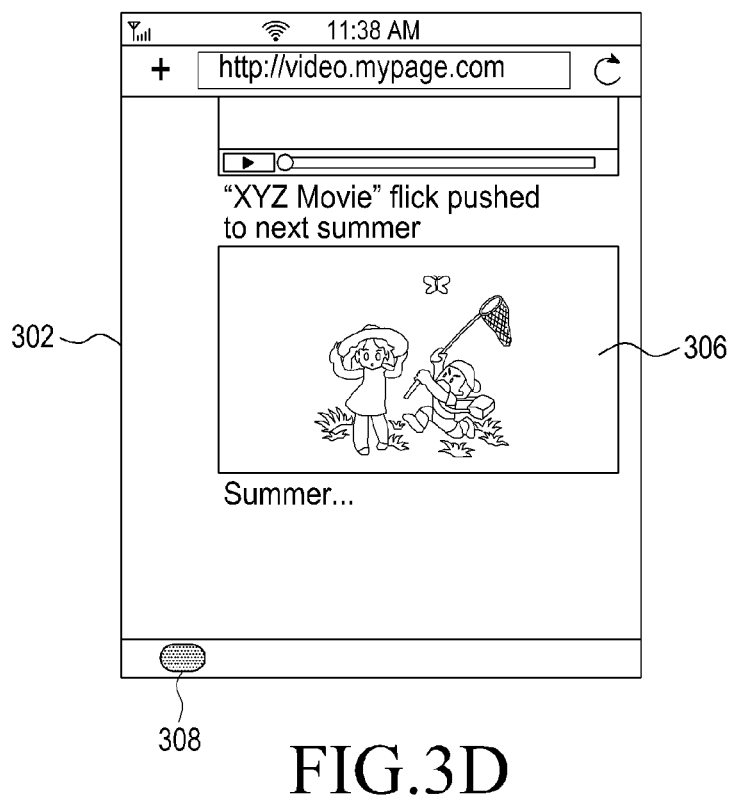

As shown in FIG. 3C, the color of the visual status indicator 310 has turned green, indicating that the video 306 has completely downloaded. For example, the web browser displays the visual status indicator even when the user is on the same webpage or in a different web page. When the user selects the visual status indicator 310, such as through tapping/dragging/touching/clicking using finger/stylus/view finder, the web browser sets the focus on the video 306 and displays the downloaded video 306 on the center of the handheld device display as shown in FIG. 3D. This eliminates the need for the user to scroll back to location of the video 306 on the current webpage 302.

Figure 4:
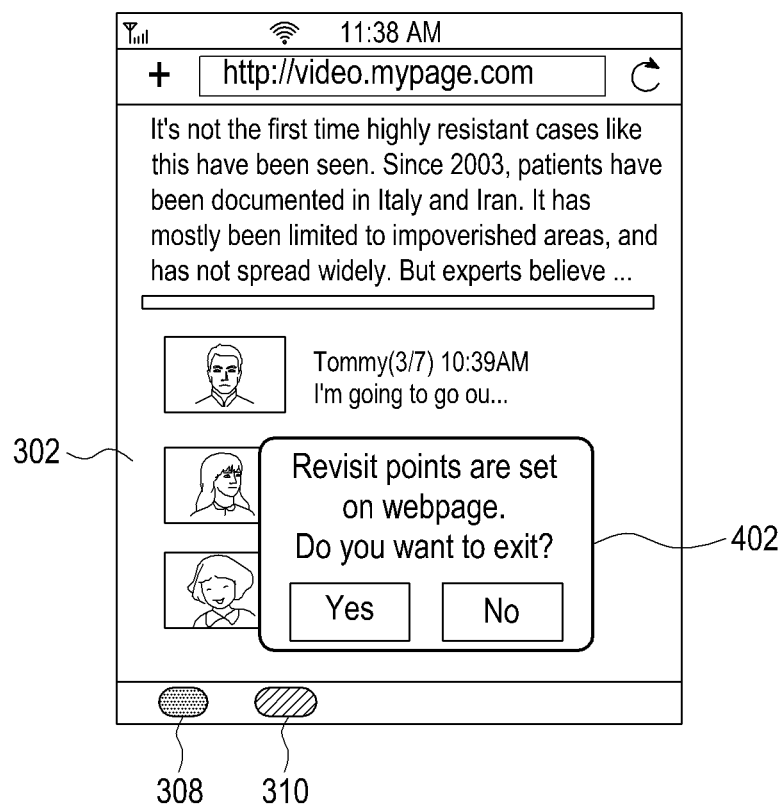
FIG. 4 describes a notification provided to the user prior to exiting a web browser displaying the webpage, according to an embodiment of the present invention.

FIG. 4 describes a notification provided to a user prior to exiting a web browser, according an embodiment of the present invention. The user has set markers at objects embedded in the webpage 302 and may not remember that the markers are set. Thus, when the user exits the web browser displaying the webpage 302, the web browser notifies the user that the markers are set at the objects and inquires whether the user really wants to exit the web browser through a notification 402 as shown in FIG. 4. Thus, the user may choose to visit the marked objects or may exit the web browser if the user is not interested in the marked objects.

Figure 5:
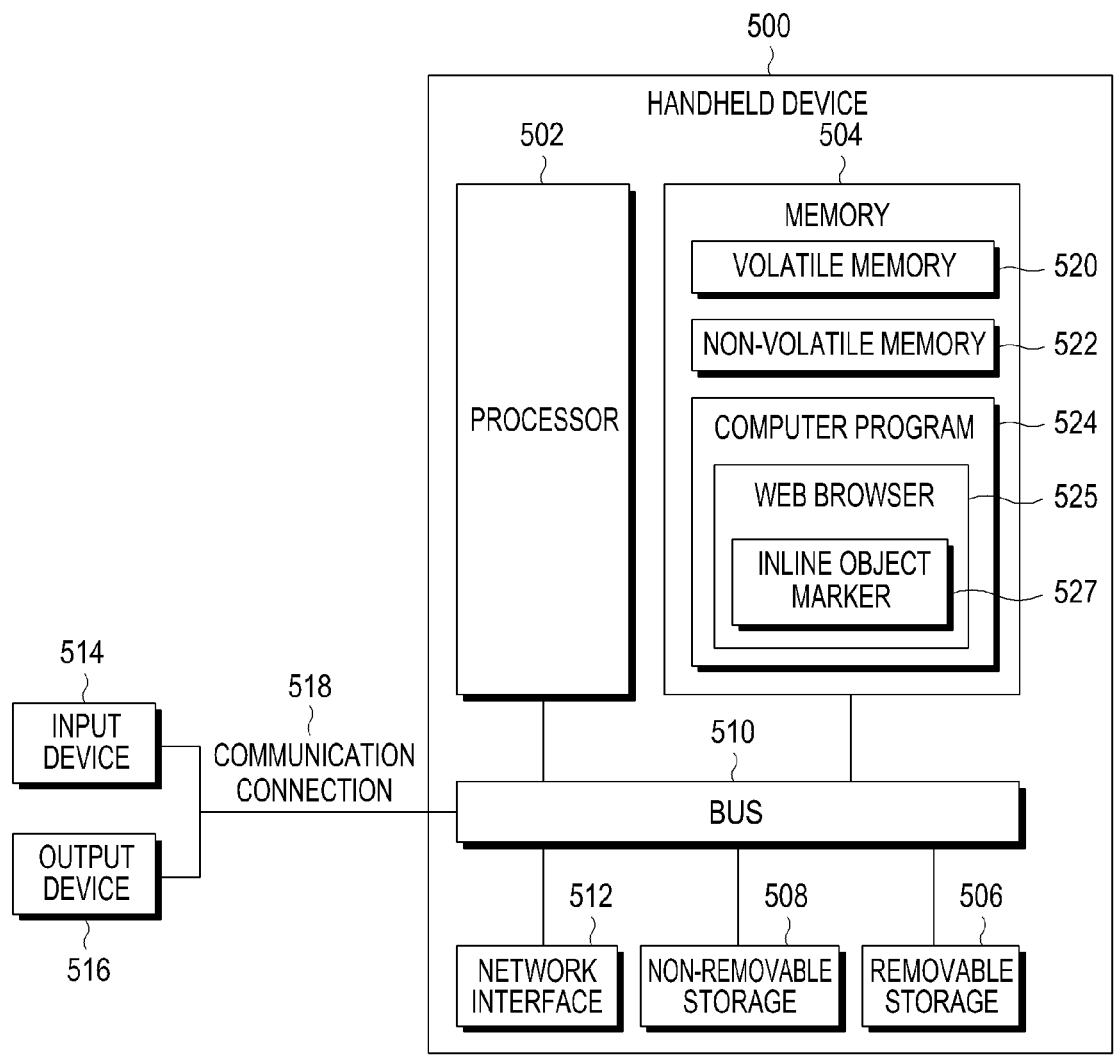
FIG. 5 illustrates a suitable handheld device for implementing embodiments of the present invention.

FIG. 5 illustrates a suitable handheld device 500 for implementing embodiments of the present invention.

A general handheld device 500, such as a palmtop, PDA, smartphone, a mobile phone, or tablet, may include the processor 502, the memory 504, a removable storage 506, and a non-removable storage 508. The handheld device 500 additionally includes a bus 510 and a network interface 512. The handheld device 500 may include or have access to at least one user input device 514, at least one output device 516, and at least one communication connection 518 such as a network interface card or a universal serial bus connection. The at least one user input device 514 may be a keyboard and/or mouse. The at least one output device 516 may be a display and/or other output devices. The communication connection 518 may include, for example, a Local Area Network (LAN), Wide Area Network (WAN), and/or a General Packet Radio Service (GPRS).

The memory 504 may include volatile memory 520 and non-volatile memory 522. A variety of computer-readable storage media may be stored in and accessed from the memory elements of the handheld device 500, such as the volatile memory 520 and the non-volatile memory 522, the removable storage 506 and the non-removable storage 508. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and Memory Sticks.

The processor 502, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, and smart cards.

Embodiments of the present invention may be implemented in conjunction with program modules, including functions, procedures, data structures, and application programs, for performing tasks, or defining abstract data types or low-level hardware contexts.

Machine-readable instructions stored on any of the above-mentioned storage media may be executable by the processor 502 of the handheld device 500. For example, a computer program 524 may include a web browser 525 having an object marker module 527 in the form of machine-readable instructions capable of notifying a user of the handheld device 500 when at least one object is downloaded, according to the teachings herein. The machine-readable instructions may cause the handheld device 500 to encode according to the embodiments of the present invention.

For example, the object marker module 527 enables the user of the handheld device 500 to set a marker on at least one object embedded in a webpage associated with the web browser 525 when the at least one object is being downloaded from a web server (not shown). Further, the object marker module 527 provides a notification to the user on a display of the handheld device when the at least one object embedded in the webpage is successfully downloaded from the web server. Additionally, the object marker module 527, when receiving a request for the at least one object embedded in the webpage on the display of the handheld device 500 from the user through the notification, displays the at least one object embedded in the webpage on the display of the handheld device 500. Moreover, the object marker module 527 removes the marker set at the at least one object embedded in the webpage.

Also, the object marker module 527, upon a request to exit of the web browser 525 associated with the webpage including at least one object from the user, determines whether a marker is set at the at least one object embedded in the webpage. The object marker module 527 provides a notification indicating the existence of the marker set at the at least one object embedded in the webpage to the user prior to exiting the web browser 525, and exits the web browser 525 associated with the webpage if no marker is set at the at least one object.

According to the embodiments of FIGS. 1 through 5, the user is provided with a snap shot of set markers by the display of a macro level view of the set markers and associated objects. The user can also quickly view objects associated with the markers in a timer-based slide show. The web browser also enables the user to add a quick note to at least one set marker. Any important information associated with the marker can be attached with a note, which the user can edit, delete or modify.

As described above, the web browser provides a timer-based view and priority-based view of the markers to the user. The timer-based view helps the user to move from one marker to another without any manual intervention. The priority-based view helps the user to filter the most important information associated with the markers. The priority-based markers can be coupled with the timer service for improved web page viewing.

By providing a method and apparatus for web browsing of a handheld device, a user is notified of a progress status of the download of an object embedded in a webpage, and can conveniently view the downloaded object.

Although embodiments have been described with reference to specific examples, it will be evident that various modifications and changes may be made to these embodiments without departing from the broader spirit and scope of the various embodiments. Furthermore, the various devices, modules, analyzers, and generators described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for web browsing on a handheld device, the method comprising:
   determining, when a marker is set on at least one object embedded in a webpage, a download status of the at least one object on which the marker is set;
   notifying, when a download of the at least one object is completed, a user of the completion of the download of the at least one object;
   removing, after the at least one object is downloaded and displayed, the marker set on the displayed at least one object;
   determining, when exiting the web browser is selected, whether there is an object on which the marker is set among at least one object embedded in the webpage;
   notifying, when there is an object on which the marker is set, the user of the existence of the object on which the marker is set; and
   exiting the web browser, when there is no object on which the marker is set.

2. The method of claim 1, wherein the at least one object comprises at least one of a video, an image, and a text.

3. The method of claim 1, further comprising:
   setting, by the user, the marker on each of the at least one object.

4. The method of claim 1, further comprising:
   extracting, when a marker is set on at least one object embedded in the webpage, a node corresponding to each of the at least one object from a document object model tree associated with the webpage and storing the extracted node; and
   displaying, when the node corresponding to the at least one objects is stored, a visual status indicator indicating a download status of each of the at least one object on a scroll bar of a web browser on which the webpage is displayed,
   wherein determining the download status of each of the at least one object is performed periodically.

5. The method of claim 4, wherein the visual status indicator indicates that the download of at least one object on which the marker is set is currently in progress, by using a color different from a color used to indicate the completion of the download.

6. The method of claim 1, wherein notifying the user comprises:
   indicating, when the download of one of the at least one object is completed, the completion of the download of the one object through a corresponding visual status indicator displayed on a scroll bar of a web browser displaying the webpage.

7. The method of claim 6, wherein the visual status indicator indicates the download of the arbitrary object is completed by using a color different from a color used to indicate that the download is in progress.

8. The method of claim 1, further comprising:
displaying each of the at least one object of which download is completed, upon receiving a request for displaying the each of at least one object of which download is completed.

9. The method of claim 1, further comprising:
when a visual status indicator indicating the completion of the download is selected on a scroll bar of the web browser displaying the webpage, displaying the at least one object corresponding to the selected visual status indicator.

10. An apparatus for web browsing on a handheld device, the apparatus comprising:
at least one memory which stores non-transitory computer-readable instructions; and
at least one processor which executes the non-transitory computer-readable instructions in order that the apparatus perform the steps of:
determining, when a marker is set on at least one object embedded in a webpage, a download status of the at least one object on which the marker is set;
notifying, when a download of the at least one object is completed, a user of the completion of the download of the at least one object;
removing, after the at least one object is downloaded and displayed, the marker set on the displayed at least one object;
determining, when exiting the web browser is selected, whether there is an object on which the marker is set among at least one object embedded in the webpage;
notifying, when there is an object on which the marker is set, the user of the existence of the object on which the marker is set; and
exiting the web browser, when there is no object on which the marker is set.

11. The apparatus of claim 10, wherein the at least one object comprises at least one of a video, an image, and a text.

12. The apparatus of claim 10, wherein the apparatus, when the at least one processor executes the non-transitory computer-readable instructions, allows the user to set the marker on each of at least one object.

13. The apparatus of claim 10, wherein the apparatus, when the at least one processor executes the non-transitory computer-readable instructions, extracts, when a marker is set on at least one object embedded in the webpage, a node corresponding to each of the at least one object from a document object model tree associated with the webpage and stores the extracted node, and displays, when the node corresponding to the at least one object is stored, a visual status indicator indicating a download status of each of the at least one object on a scroll bar of a web browser on which the webpage is displayed, and periodically determines the download status of each of the at least one object.

14. The apparatus of claim 13, wherein the visual status indicator indicates that the download of the at least one object on which the marker is set is currently in progress, by using a color different from a color used to indicate the completion of the download.

15. The apparatus of claim 10, wherein the apparatus, when the at least one processor executes the non-transitory computer-readable instructions, displays the at least one object, upon receiving a request for displaying the at least one object of which download is completed.

16. The apparatus of claim 10, wherein, when a visual status indicator indicating the completion of the download is selected on a scroll bar of the web browser displaying the webpage, the apparatus, when the at least one processor executes the non-transitory computer-readable instructions, displays the at least one object corresponding to the selected visual status indicator.

* * * * *